US011588811B2

(12) United States Patent
Lee et al.

(10) Patent No.: US 11,588,811 B2
(45) Date of Patent: Feb. 21, 2023

(54) ELECTRONIC APPARATUS INCLUDING NON-VOLATILE MEMORY

(71) Applicant: LG ELECTRONICS INC., Seoul (KR)

(72) Inventors: Sanghee Lee, Seoul (KR); Sungmin Kim, Seoul (KR); Sungmin Park, Seoul (KR); Jemin Woo, Seoul (KR); Kiyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 749 days.

(21) Appl. No.: 16/530,456

(22) Filed: Aug. 2, 2019

(65) Prior Publication Data

US 2020/0045036 A1 Feb. 6, 2020

(30) Foreign Application Priority Data

Aug. 3, 2018 (KR) ........................ 10-2018-0090631

(51) Int. Cl.
*H04L 9/40* (2022.01)
*G06F 3/06* (2006.01)
*G11C 29/52* (2006.01)

(52) U.S. Cl.
CPC .......... *H04L 63/083* (2013.01); *G06F 3/0623* (2013.01); *G06F 3/0679* (2013.01); *G11C 29/52* (2013.01); *H04L 63/0435* (2013.01)

(58) Field of Classification Search
CPC . H04L 63/083; H04L 63/0435; G06F 3/0623; G06F 3/0679; G11C 29/52
See application file for complete search history.

(56) References Cited

U.S. PATENT DOCUMENTS

2009/0113117 A1* 4/2009 Dolgunov ............... G06F 21/64 711/163
2011/0066856 A1* 3/2011 Yao ....................... H04L 9/3271 380/278
2016/0026783 A1* 1/2016 Buer ...................... G06F 3/0622 711/103
2016/0140357 A1* 5/2016 Newell ................. G06F 3/0679 726/2
2018/0091308 A1* 3/2018 Durham .............. G06F 12/1408

* cited by examiner

*Primary Examiner* — Hee K Song
(74) *Attorney, Agent, or Firm* — Ked & Associates LLP

(57) ABSTRACT

Disclosed is an electronic apparatus. The electronic apparatus includes: a non-volatile memory having no internal controller; and a controller configured to: control the non-volatile memory, and transmit, to the non-volatile memory, first data and a generated first message authentication code (MAC). Accordingly, it is possible to efficiently defend against a replay attack in a non-volatile memory having no internal controller.

18 Claims, 16 Drawing Sheets

ELECTRONIC APPARATUS INCLUDING NON-VOLATILE MEMORY

CROSS-REFERENCE TO RELATED APPLICATION

This application claims priority under 35 U.S.C. § 119 to Korean Application No. 10-2018-0090631 filed on Aug. 3, 2018, whose entire disclosures is hereby incorporated by reference.

BACKGROUND

1. Field

The present invention relates to an electronic apparatus and, more particularly, an electronic apparatus including a non-volatile memory capable of efficiently defending against a replay attack without having an internal controller.

2. Background

An electronic apparatus includes a non-volatile memory that stores data to process a variety of signals, especially even after the apparatus is power-off.

A raw flash memory among non-volatile memories does not include a controller, unlike an eMMC/UFS. Accordingly, the raw flash memory is susceptible to a replay attack, which keeps data transmitted by a transmitter and uses the data again.

Meanwhile, a target of the replay attack may be, for example, a license file in which a period of usage of content is recorded, vulnerable data on which security update has yet to be performed, etc.

In particular, since a recipient is not able to know that previously received data is reused and transmitted for this replay attack, a general symmetric or asymmetric algorithm is not enough to defend against an attack which uses the whole data again.

BRIEF DESCRIPTION OF THE DRAWINGS

The embodiments will be described in detail with reference to the following drawings in which like reference numerals refer to like elements wherein.

DETAILED DESCRIPTION

Hereinafter, the present invention will be described in more detail with reference to the drawings.

In the following description, the suffixes "module" and "unit" are used or combined with each other only in consideration of ease in the preparation of the specification, and do not have or serve as different meanings. Accordingly, the suffixes "module" and "unit" may be interchanged with each other.

Figure 1:
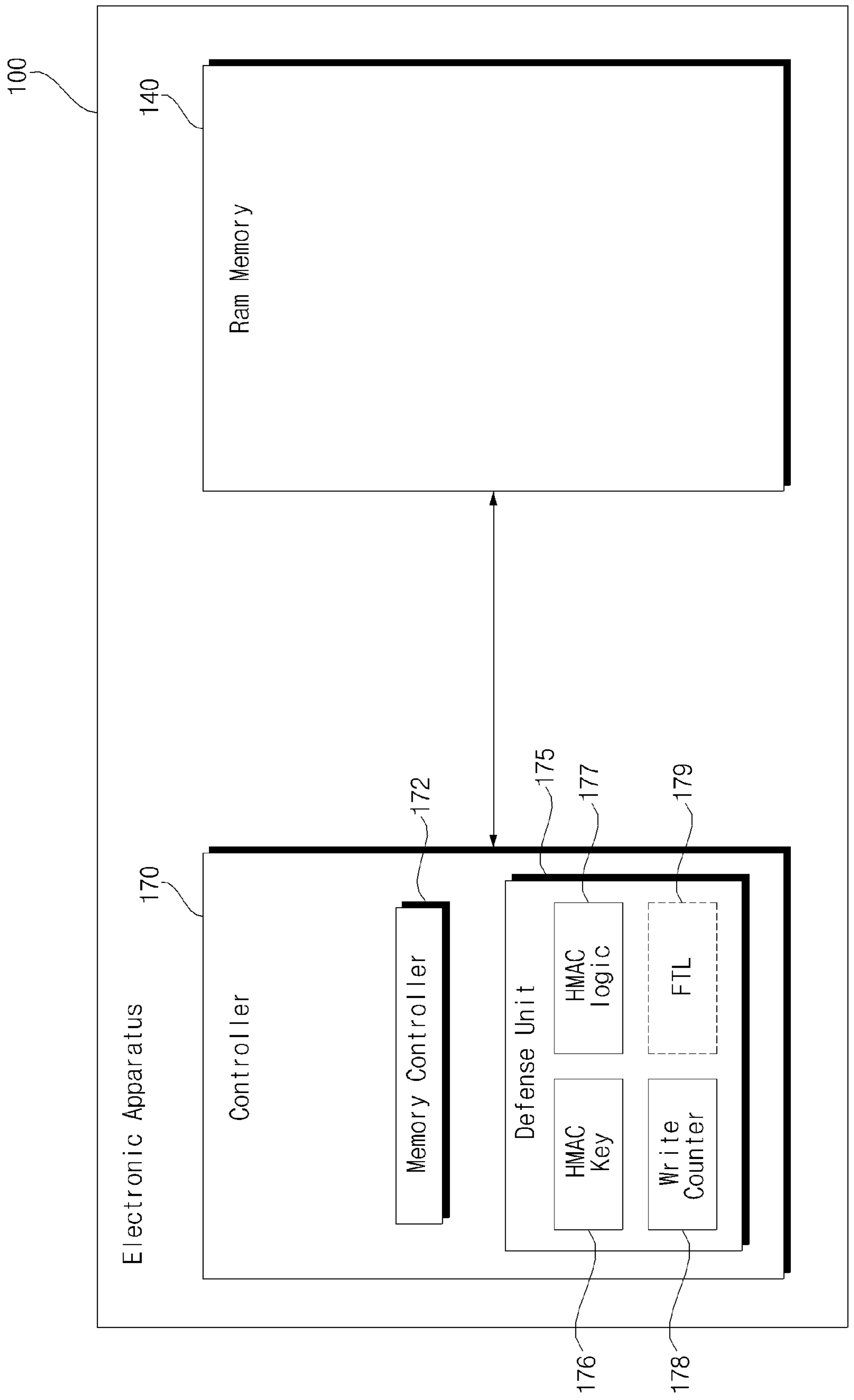
FIG. 1 is an internal block diagram illustrating an electronic apparatus according to an embodiment of the present invention.

FIG. 1 is an internal block diagram illustrating an electronic apparatus according to an embodiment of the present invention.

With reference to the drawing, an electronic device 100 may include a non-volatile memory 140 provided without an internal controller, and a controller 170 for controlling the non-volatile memory 140.

The non-volatile memory 140 may include a raw flash memory.

Meanwhile, the non-volatile memory 140 needs to be managed or translated according to hardware properties thereof. Such management or translation may be performed by a Flash Translation Layer (FTL).

An eMMC/UFS among various types of the non-volatile memory 140 includes an internal controller, and may be managed or translated by the FTL according to hardware properties thereof.

However, a raw flash memory among various types of the non-volatile memory 140 does not include an internal controller, and therefore, management or translation of the raw flash memory according to hardware properties thereof may be performed by the controller 170 which is external to the non-volatile memory 140.

That is, the controller 170 may include a memory controller 172 for controlling the non-volatile memory 140, and a defense unit 175 for defending against an external replay attack.

The defense unit 175 is a hardware key, and may include a hash-based message authentication code (HMAC) key 176 which is a message authentication code key, a HMAC logic 177 which is a message authentication code logic, a write counter 178, and an FTL 179.

Figure 2A:
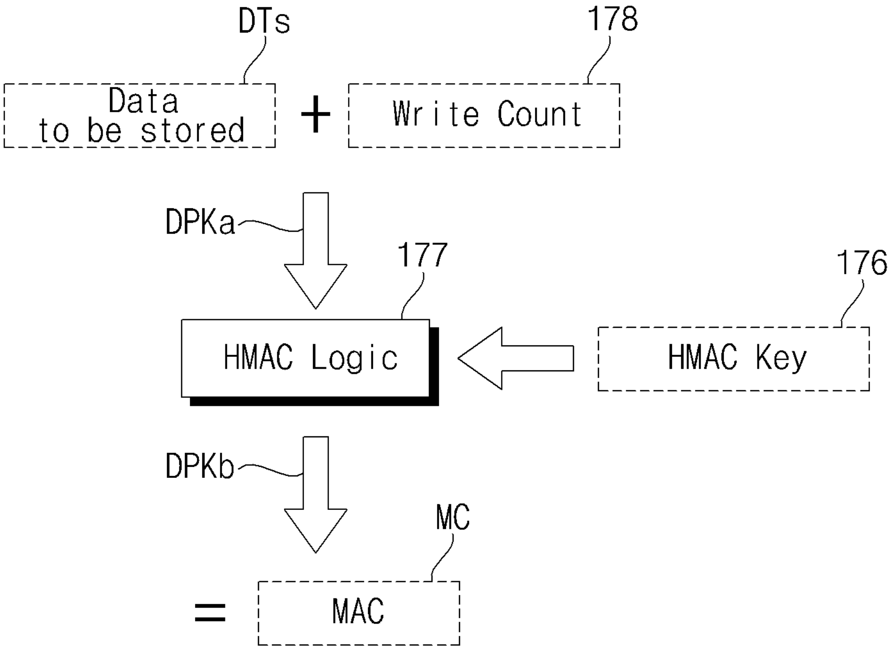
FIG. 2A is a diagram illustrating of preparation of transmission of data to a non-volatile memory.

FIG. 2A is a diagram illustrating of preparation of transmission of data to a non-volatile memory.

Referring to FIG. 2A, when data necessary to be protected is stored in the non-volatile memory 140, the controller 170 of the electronic apparatus 100 generates data packet DPka that includes the data to be protected and a write counter 178.

In addition, the controller 170 of the electronic apparatus 100 generates a message authentication code (MAC) for the data packet DPkb to be transmitted, using the data packet DPKA, a unique hardware key HMAC key) 176, and the HMAC logic 177.

It is possible to determine a replay attack, which will be described later on, based on the MAC and accordingly efficiently defend against the replay attack.

Meanwhile, the write counter 178 increases at each write time.

Figure 2B:
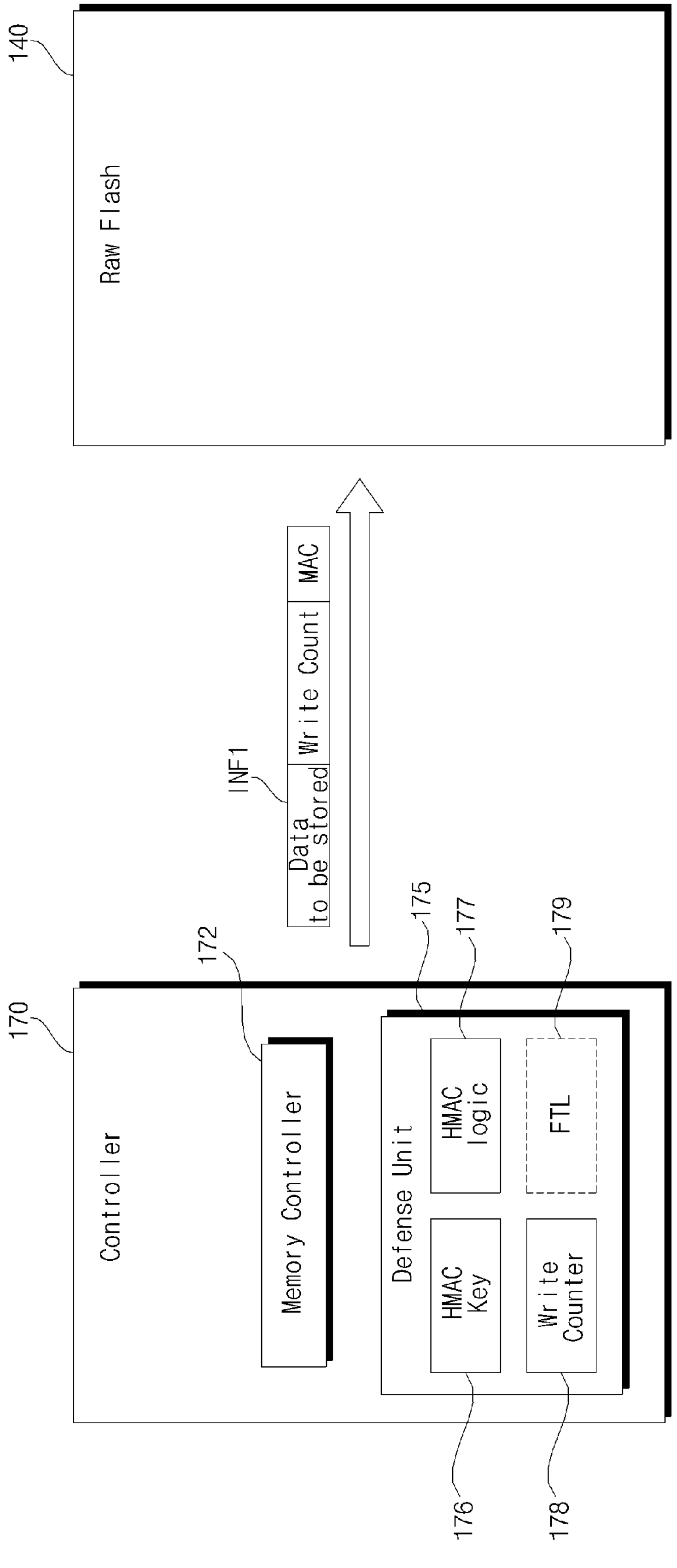
FIG. 2B is a diagram illustrating transmission and storage of data with respect to a non-volatile memory.

FIG. 2B is a diagram illustrating transmission and storage of data with respect to a non-volatile memory.

With reference to the drawing, the controller 170 of the electronic apparatus 100 may transmit data to be transmitted, a write count, and an MAC together to the non-volatile memory 140.

In particular, the controller 170 of the electronic device 100 may transmit a data packet INF1 including the data to be stored, the write count, and the MAC to the non-volatile memory 140.

Meanwhile, a mapping location of the data packet INF1 may be determined by the non-volatile memory 140.

Meanwhile, the controller 170 of the electronic apparatus 100 may transmit different counts together with the same first data at a first point in time and at a second point in time. Accordingly, it is possible to efficiently defend against a replay attack.

Meanwhile, the controller 170 of the electronic apparatus 100 may transmit different counts together with the same first data at a first point and at a second point in time. Accordingly, it is possible to efficiently defend against a replay attack.

Figure 2C:
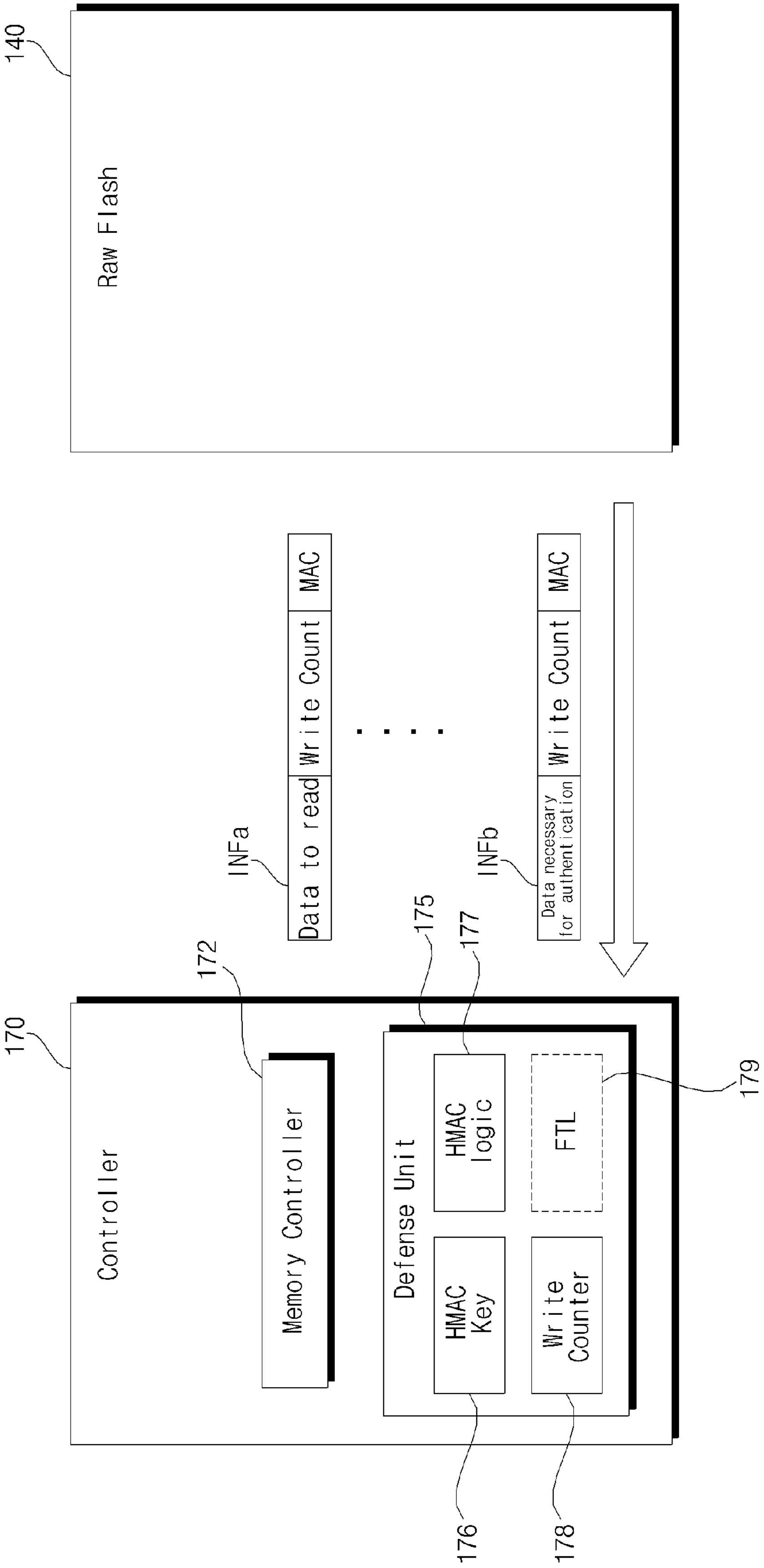
FIG. 2C is a diagram illustrating reading and authentication of data from a non-volatile memory.

FIG. 2C is a diagram illustrating reading and authorization data in a non-volatile memory.

Referring to FIG. 2C, the controller 170 of the electronic apparatus 100 may receive data to be read, a write count, and an MAC from the non-volatile memory 140.

In particular, the controller 170 of the electronic apparatus 100 may receive a data packet INFa including the data to be read, the write count, and the MAC from the non-volatile memory 140.

Meanwhile, the controller 170 of the electronic apparatus 100 may receive data necessary for authentication, a write count, and a MAC from the non-volatile memory 140.

In particular, the controller 170 of the electronic apparatus 100 may receive a data packet INFb including the data necessary for authentication, the write count, and the MAC from the non-volatile memory 140.

Figure 3A:
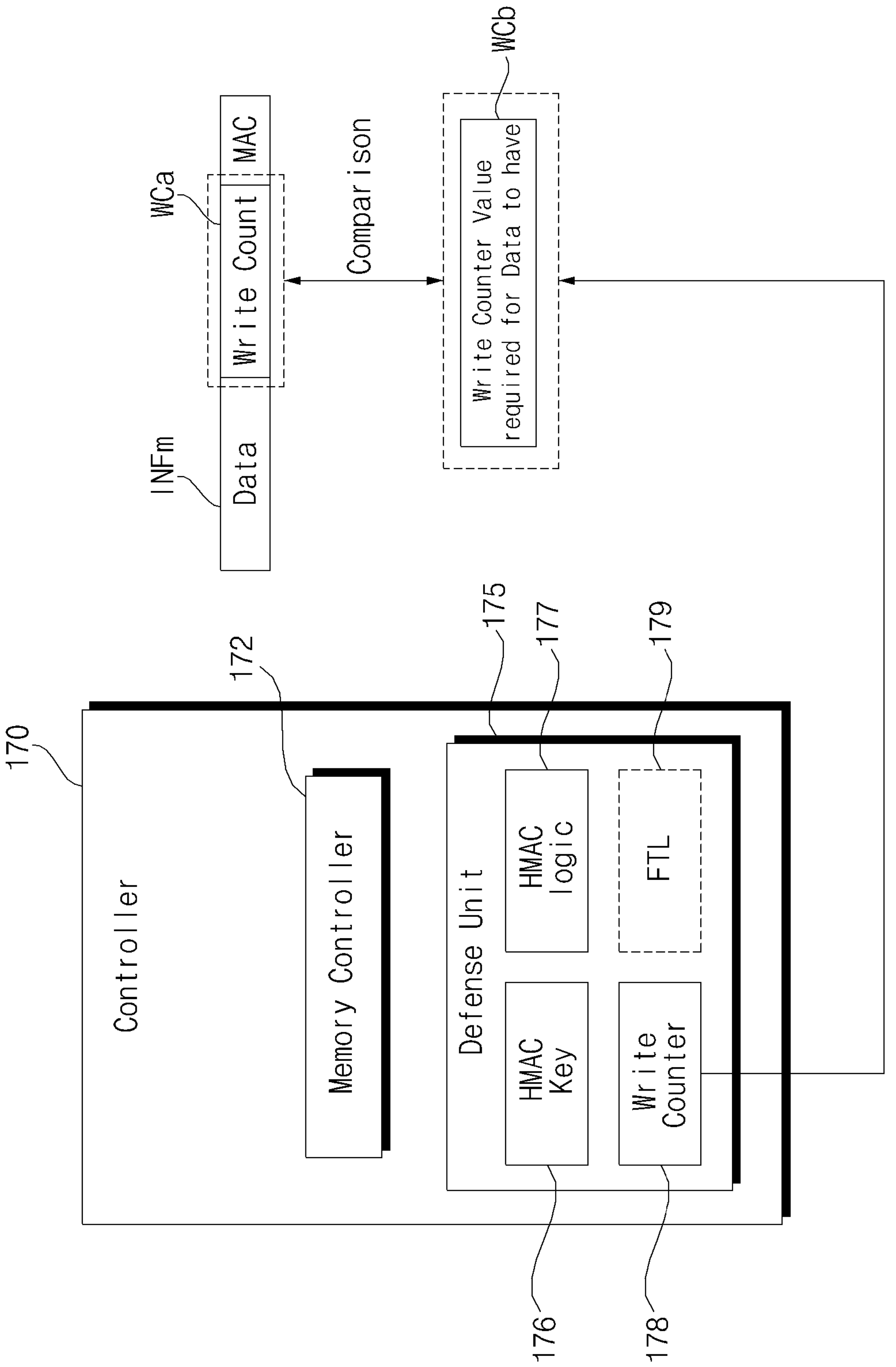
FIG. 3A is a diagram illustrating an example of detecting a data replay attack.

FIG. 3A is a diagram illustrating an example of detecting a data replay attack.

With reference to the drawing, the write counter 178 in the controller 170 of the electronic apparatus 100 discovers a write count value required for the data to be read.

In addition, the controller 170 of the electronic apparatus 100 compares a write count Wca, which is included together with data and an MAC in a data packet INFm received from the non-volatile memory 140*a*, with a write count value Wcb required for to-be-read data. If the write count Wca matches with the write count valve Wcb, the controller 170 performs a data read operation.

Meanwhile, the controller 170 of the electronic apparatus 100 compares a write count Wca, which is included together with data and an MAC in a data packet INFm received from the non-volatile memory 140, with a write count value Wcb required for to-be-read data. If the write count Wca does not match with the write count value Wcb, the controller 170 stops a data read operation.

Figure 3B:
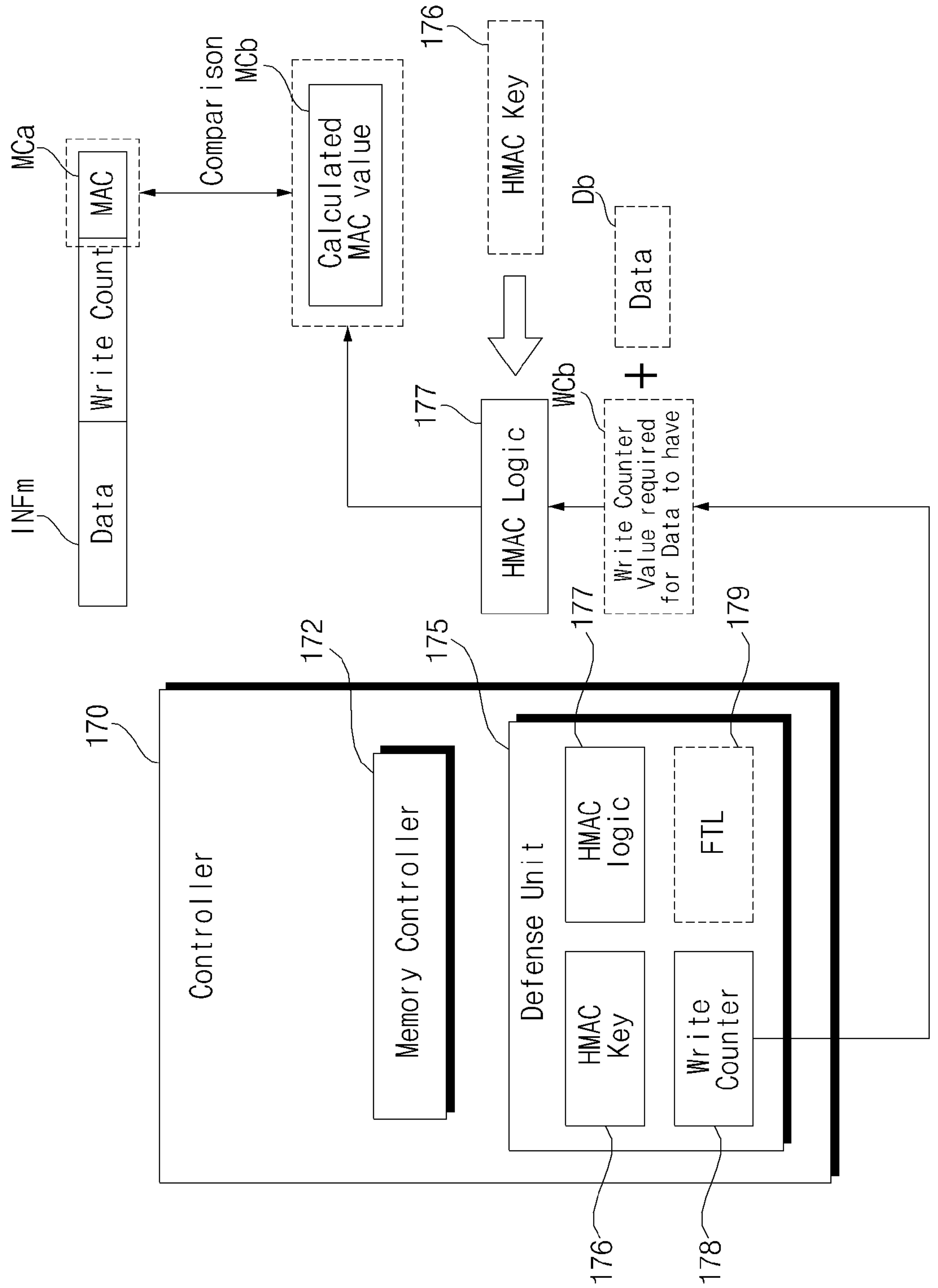
FIG. 3B is a diagram illustrating another example of detecting a data replay attack.

FIG. 3B is a diagram illustrating another example of detecting a data replay attack.

Referring to FIG. 3B, the write counter 178 in the controller 170 of the electronic apparatus 100 discovers a write count value WCb which is required for to-be-read data.

In addition, the HMAC logic 177 in the controller 170 of the electronic apparatus 100 calculates an MAC value MCb using the write count value Wcb, which is required for the to-be-read data, and the HMAC key 176, which is a message authentication code key.

In particular, the HMAC logic 177 in the controller 170 of the electronic apparatus 100 may calculate the MAC value MCb by using the write count value WCb required for the to-be-read data, the HMAC key 176, and data Db.

In addition, the controller 170 of the electronic apparatus 100 compares a MAC MCa, which is included together with data and a write count in a data packet INFm received from the non-volatile memory 140, with the calculated MAC value MCb. If the MAC MCa matches with the calculated MAC value MCb, the controller 170 performs a data read operation.

Meanwhile, the controller 170 of the electronic apparatus 100 compares a MAC MCa, which is included together with data and a write count in a data packet INFm received from the non-volatile memory 140, with the calculated MAC value MCb. If the MAC MCa does not match with the calculated MAC value MCb, the controller 170 stops a data read operation.

Figure 3C:
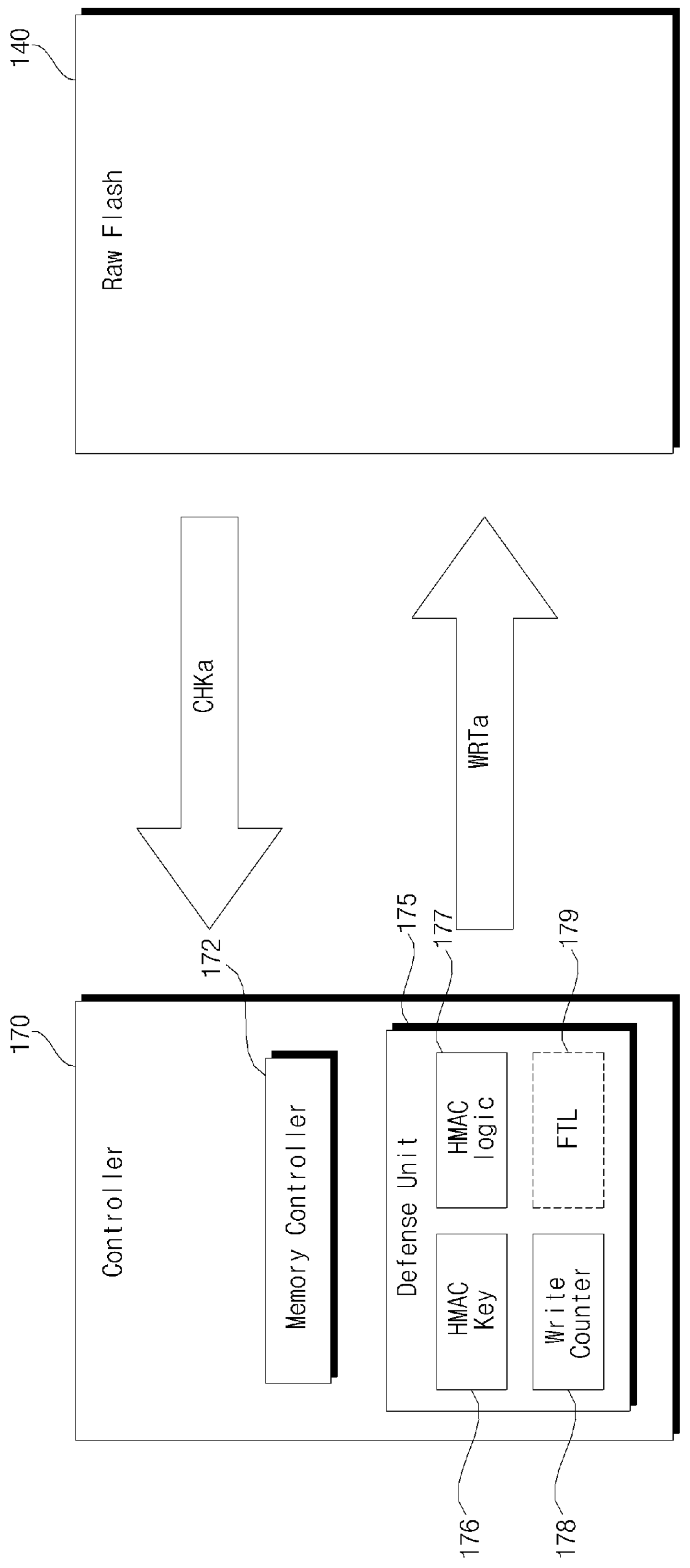
FIG. 3C is a diagram illustrating data garbage collection.

FIG. 3C is a diagram illustrating data garbage collection.

Data garbage collection may occur in the non-volatile memory 140.

Accordingly, the controller 170 of the electronic apparatus 100 may read validate data from the non-volatile memory 140, and then check a replay attack (CHKa).

In addition, for the data garbage collection, the controller 170 of the electronic apparatus 100 performs a write operation with a new MAC (CHKa), while writing a plurality of validate data to the non-volatile memory 140.

Figure 4:
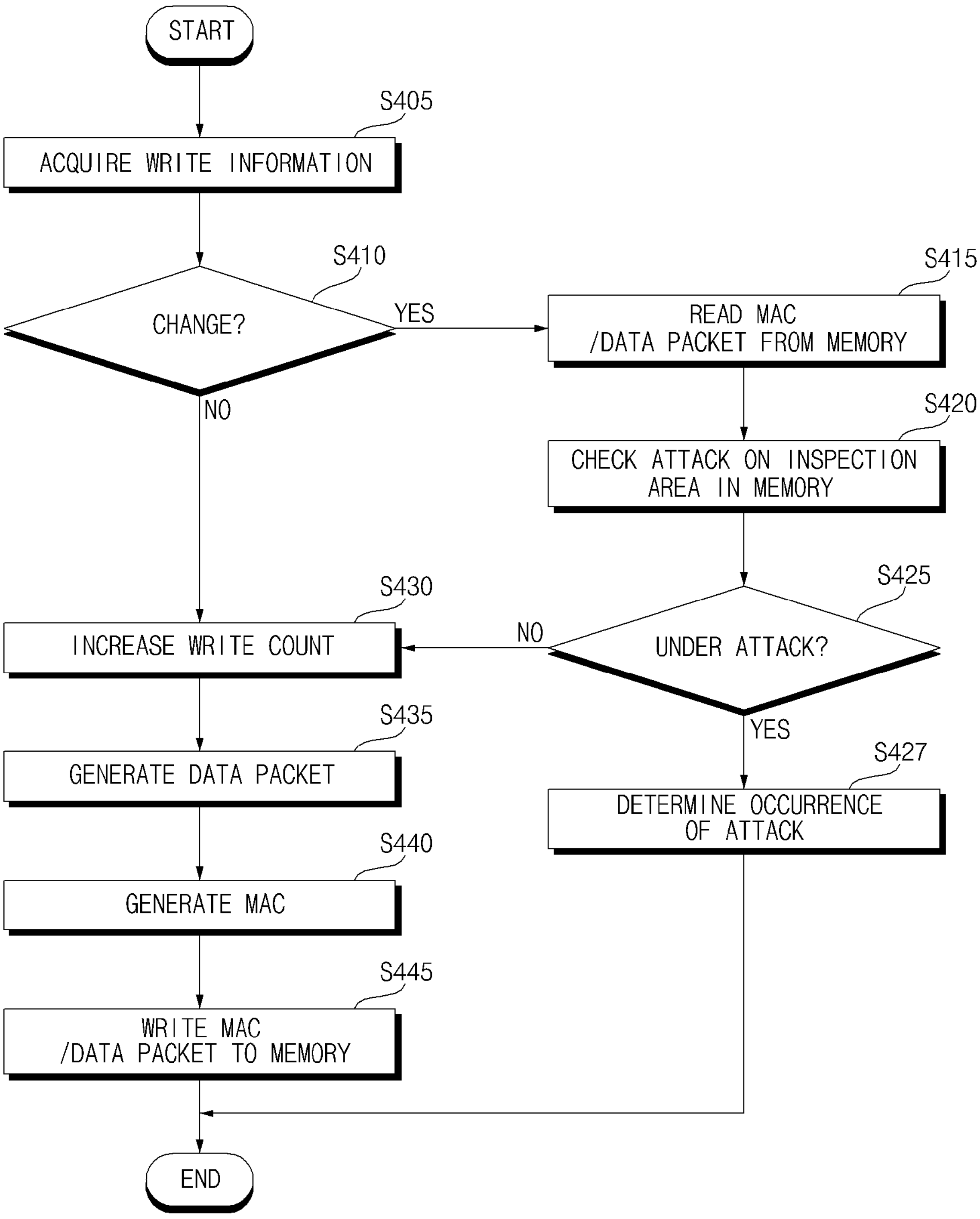
FIG. 4 is a flowchart illustrating an operation of writing into a non-volatile memory.

FIG. 4 is a flowchart illustrating an operation of writing into a non-volatile memory.

Referring to FIG. 4, the controller 170 of the electronic apparatus 100 discovers write information from FTL 179 or the like (S405).

Next, the controller 170 of the electronic apparatus 100 determines whether the write information has changed (S410).

If the write information has not changed, the controller 170 of the electronic apparatus 100 increases a count of the write counter 178 (S430).

Next, the controller 170 of the electronic apparatus 100 generates a data packet to be stored in the non-volatile memory 140 (S435).

Next, the controller 170 of the electronic apparatus 100 generates an MAC to be transmitted together with the to-be-stored data packet (S440).

Next, the controller 170 of the electronic apparatus 100 transmits a MAC/data packet including the to-be-stored data, the write count, and the MAC to the non-volatile memory 140 (S445).

Meanwhile, if it is determined in the step S410 that the write information has changed, the controller 170 of the electronic apparatus 100 reads the MAC/data packet, which includes the to-be-stored data, the write count, and the MAC, from the non-volatile memory 140 (S415).

In addition, the controller 170 of the electronic apparatus 100 checks an attack on an inspection area in the non-volatile memory 140 (S420).

Checking the inspection area in the non-volatile memory 140 may include checking a count and checking an MAC in the MAC/data packet.

First, the controller 170 of the electronic apparatus 100 may check a count in the MAC/data packet read from the non-volatile memory 140, as shown in FIG. 3A.

That is, the write counter 178 in the controller 170 of the electronic apparatus 100 discovers a write count value required for to-be-read data.

In addition, the controller 170 of the electronic apparatus 100 compares a write count Wca, which is included together with data and an MAC in a data packet INFm received from the non-volatile memory 140, with a write count value Wcb required for to-be-read data so as to determine whether the write count Wca matches with the write count value Wcb.

Next, after checking the count, the controller 170 of the electronic apparatus 100 checks an MAC in the MAC/data packet, which is read from the non-volatile memory 140, as shown in FIG. 3B.

That is, the HMAC logic 177 in the controller 170 of the electronic apparatus 100 may calculate an MAC value MCb by using the write count value WCb required for the to-be-read data, the HMAC key 176 which is a message authentication code key, and data Db.

In addition, the controller 170 of the electronic apparatus 100 compares a MAC MCa, which is included together with data and a write count in the data packet INFm received from the non-volatile memory 140, with the calculated MAC value MCb so as to determine whether the MAC MCa matches with the calculated MAC value.

The controller 170 of the electronic apparatus 100 determines whether there has been a replay attack, based on a write count and an MAC (S425). If there has been a replay attack, the controller 170 of the electronic apparatus 100 determines occurrence of the replay attack (S427).

In one example, if write counts are compared and determined to be inconsistent, the controller 170 of the electronic apparatus 100 may determine occurrence of a replay attack.

In another example, if write counts are consistent but MACs are inconsistent, the controller 170 of the electronic apparatus 100 may determine occurrence of a replay attack.

In yet another example, if write counts are inconsistent but MACs are consistent, the controller 170 of the electronic apparatus 100 may determine occurrence of a replay attack.

Figure 5:
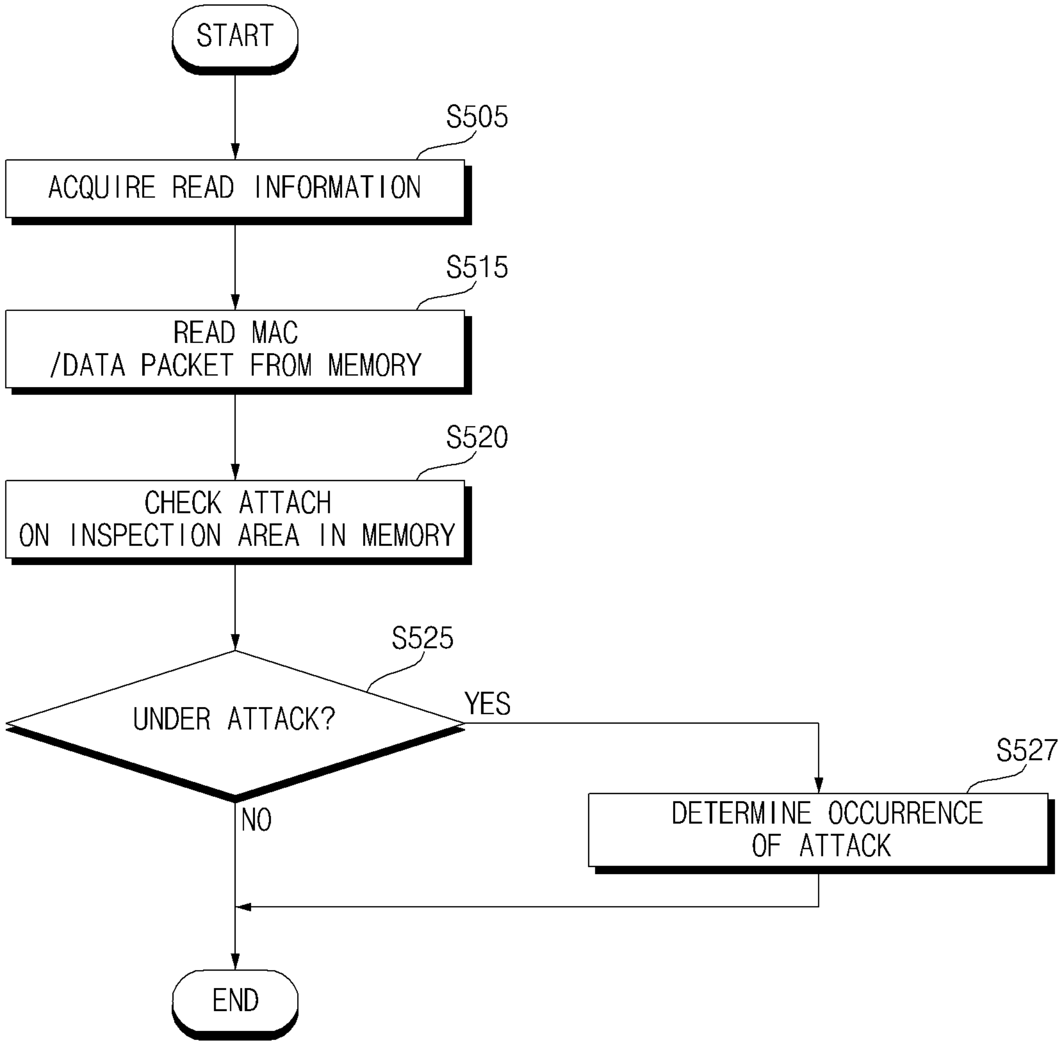
FIG. 5 is a flowchart illustrating an operation of reading from a non-volatile memory.

FIG. 5 is a flowchart illustrating a read operation on a non-volatile memory.

Referring to FIG. 5, the controller 170 of the electronic apparatus 100 acquires write information from the FTL 179 and the like (S505).

Next, based on the write information, the controller 170 of the electronic apparatus 100 reads an MAC/data packet, which includes to-be-read data, a count, and an MAC, from the non-volatile memory 140 (S515).

Next, the controller 170 of the electronic apparatus 100 checks an attack on an inspection area in the non-volatile memory 140 (S520).

Checking out an attack on the inspection area in the non-volatile memory 140 may include checking a count and checking an MAC in the MAC/data packet.

First, the controller 170 of the electronic apparatus 100 checks the count in the MAC/data packet, which is read from the non-volatile memory 140, as shown in FIG. 3A.

That is, the write counter 178 in the controller 170 of the electronic apparatus 100 discovers a count value required for to-be-read data.

Then, the controller 170 of the electronic apparatus 100 compares a count WCa, which is included together with data and an MAC in a data packet INFm received from the non-volatile memory 140, with a count value WCb required for the to-be-read data so as to determine whether the count Wca matches with the count value Wcb.

Next, after checking the count, the controller 170 of the electronic apparatus 100 checks the MAC in the MAC/data packet read from the non-volatile memory 140, as shown in FIG. 3B.

That is, the HMAC logic 177 in the controller 170 of the electronic apparatus 100 may calculate an MAC value MCb by using the count value WCb required for the to-be-read data, the HMAC key 176 which is a message authentication code key, and data Db.

In addition, the controller 170 of the electronic apparatus 100 compares an MC MCa, which is included in data, and a count in the data packet INFm received from the non-volatile memory 140, with the calculated MAC value MCb so as to determine whether the MAC MCa matches with the calculated MAC value MCb.

The controller 170 of the electronic apparatus 100 determines whether there has been a replay attack, based on a count and an MAC (S525). If there has been a replay attack, the controller 170 of the electronic apparatus 100 determine occurrence of a replay attack (S527).

In one example, if counts are compared and determined to be inconsistent, the controller 170 of the electronic apparatus 100 may determine occurrence of a replay attack.

In another example, if counts are consistent but MACs are not inconsistent, the controller 170 of the electronic apparatus 100 may determine occurrence of a replay attack.

In yet another example, if counts are inconsistent and MACs are inconsistent, the controller 170 of the electronic apparatus 100 may determine occurrence of a replay attack.

Figure 6:
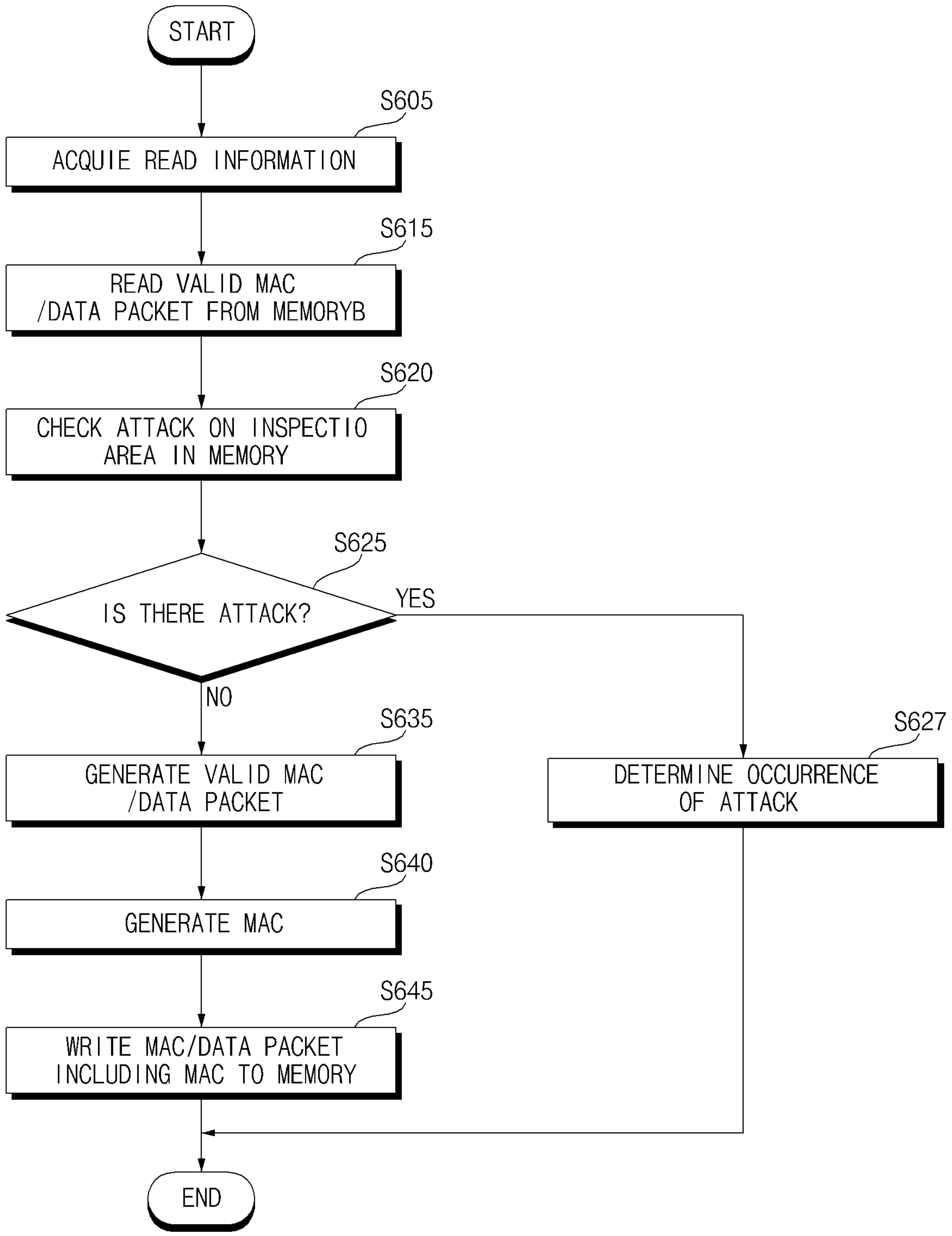
FIG. 6 is a flowchart illustrating data garbage collection from a non-volatile memory.

FIG. 6 is a flowchart illustrating data garbage collection from a non-volatile memory.

Referring to FIG. 6, the controller 170 of the electronic apparatus 100 acquires read information from the FTL 179 and the like (S605).

Next, based on the read information, the controller 170 of the electronic apparatus 100 reads an MAC/data packet including to-be-read data, a count, and an MAC from the non-volatile memory 140 (S615).

In addition, the controller 170 of the electronic apparatus 100 checks an attack on an inspection area in the non-volatile memory 140 (S620).

Checking the inspection area in the non-volatile memory 140 may include checking a count and checking an MAC in an MAC/data packet.

First, the controller 170 of the electronic apparatus 100 may check a count in an MAC/data packet read from the non-volatile memory 140, as shown in FIG. 3A.

That is, the write counter 178 in the controller 170 of the electronic apparatus 100 discovers a count value required for the to-be-read data.

In addition, the controller 170 of the electronic apparatus 100 compares a count Wca, which is included together with data and an MAC in a data packet INFm received from the non-volatile memory 140, with a count value Wcb required for to-be-read data so as to determine whether the count Wca matches with the count value Wcb.

Next, after checking the count, the controller 170 of the electronic apparatus 100 checks the MAC in the MAC/data packet, which is read to the non-volatile memory 140, as shown in FIG. 3B.

That is, the HMAC logic 177 in the controller 170 of the electronic apparatus 100 may calculate an MAC value MCb by using the count value WCb required for the to-be-read data, the HMAC key 176 which is an MAC key, and data Db.

In addition, the controller 170 of the electronic apparatus 100 compares a MAC MCa, which is included together with data and a count in the data packet INFm received from the non-volatile memory 140, with the calculated MAC value MCb so as to determine whether the MAC MCa matches with the calculated MAC value Mb.

The controller 170 of the electronic apparatus 100 determines whether there has been a replay attack, based on a count and an MAC (S625). If it is determined that there has been a replay attack, the controller 170 of the electronic apparatus 100 determines occurrence of a replay attack (S627).

In one example, if counts are compared and determined to be inconsistent, the controller 170 of the electronic apparatus 100 may determine occurrence of a replay attack.

In another example, if counts are consistent but MACs are inconsistent, the controller 170 of the electronic apparatus 100 may determine occurrence of a replay attack.

In yet another example, if the count does are inconsistent and the MAC are inconsistent, the controller 170 of the electronic apparatus 100 may determine occurrence of a replay attack.

If it is determined in the step S625 that there has been no replay attack, the controller 170 of the electronic apparatus 100 generates a data packet to be stored in the non-volatile memory 140 (S635).

In addition, the controller 170 of the electronic apparatus 100 generates an MAC which is to be transmitted together with the to-be-stored data packet (S640).

Next, the controller 170 of the electronic apparatus 100 transmits an MAC/data packet, which includes the to-be-stored data, a write count, and the generated MAC, to the non-volatile memory 140 (S645).

Figure 7:
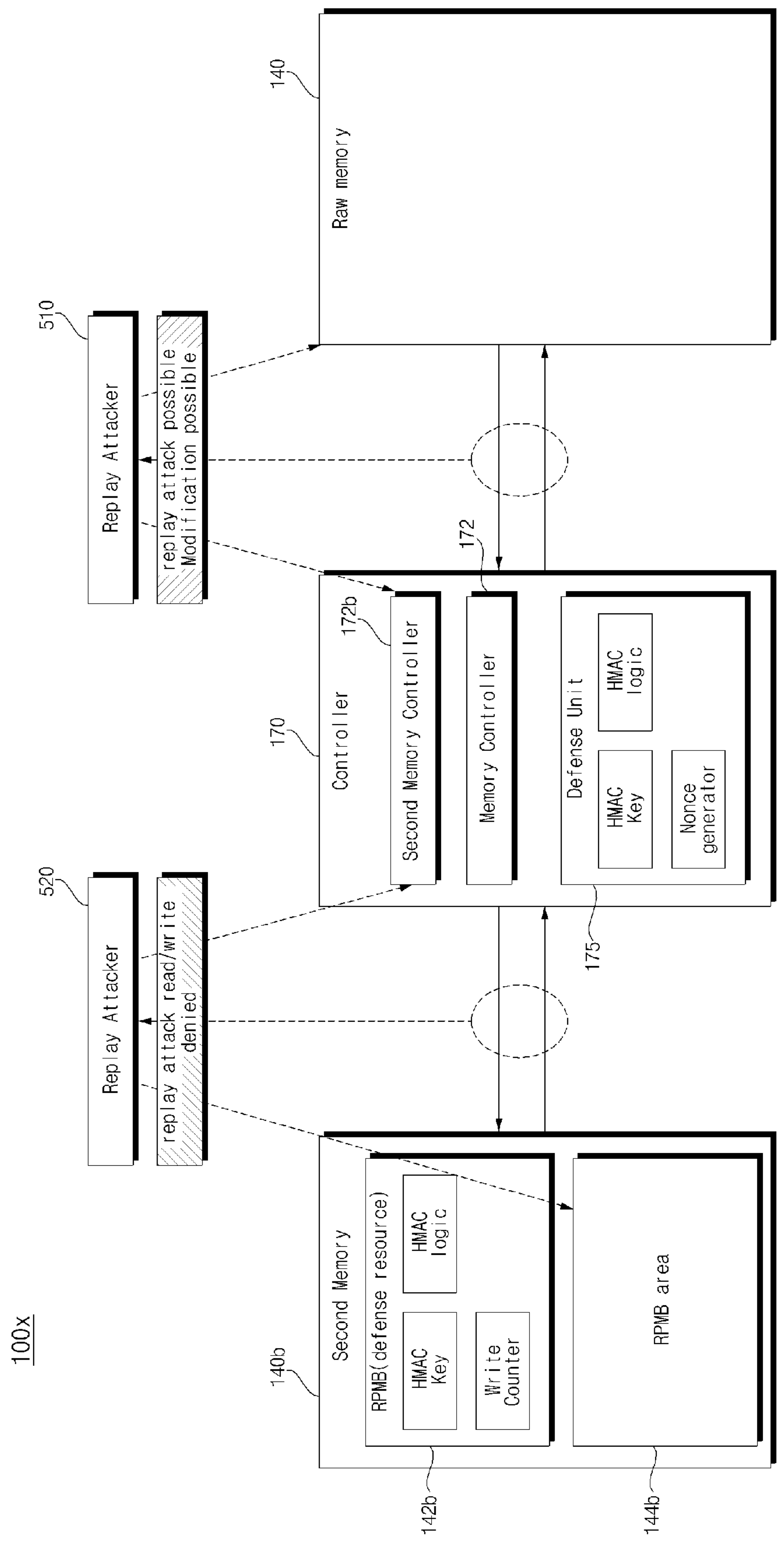
FIG. 7 is a diagram for explanation of a replay attack.

FIG. 7 is a diagram for explanation of a replay attack.

Referring to FIG. 7, an electronic apparatus 100*x* may include a controller 170*z*, a non-volatile memory 140*x*, and a second memory 140*b*.

The controller 170*x* may include a memory controller 172 for controlling the non-volatile memory 140*x*.

In addition, the controller 170*x* may include a second memory controller 172*b* for controlling the second memory 140*b*.

Meanwhile, the non-volatile memory 140*x* may include a raw flash memory.

The raw flash memory does not include an internal controller, and thus, management or translation suitable for hardware characteristics may be performed by the controller 170*x* which is external to the non-volatile memory 140*x*.

Meanwhile, the second memory 140*b* may be an eMMC/UFS.

Accordingly, the second memory 140*b* may include a defense unit 142*b* and a replay protection memory block to defend against a replay attack. The defense unit 142 may include an HMAC key, an HMAC logic, and a write counter.

Meanwhile, in the case where a replay attacker 510 carries out a replay attack on the non-volatile memory 140*x*, the non-volatile memory 140*x* is susceptible to a replay attack, which uses data which is previously transmitted by a transmitter and then stored. It is because the non-volatile memory 140*x* does not include an internal controller and there is no protection unit in spite of the controller 170*x* of the electronic apparatus 100*x*.

However, the second memory 140*b* includes the defense unit 142*b*, which includes the HAMC key, the HMAC logic, and the write counter to defend against a replay attack, and the replay protection memory block, and therefore, even though a replay attacker 520 carries out a replay attack on the second memory 140*b*, it is possible to defend against the replay attack.

Figure 8:
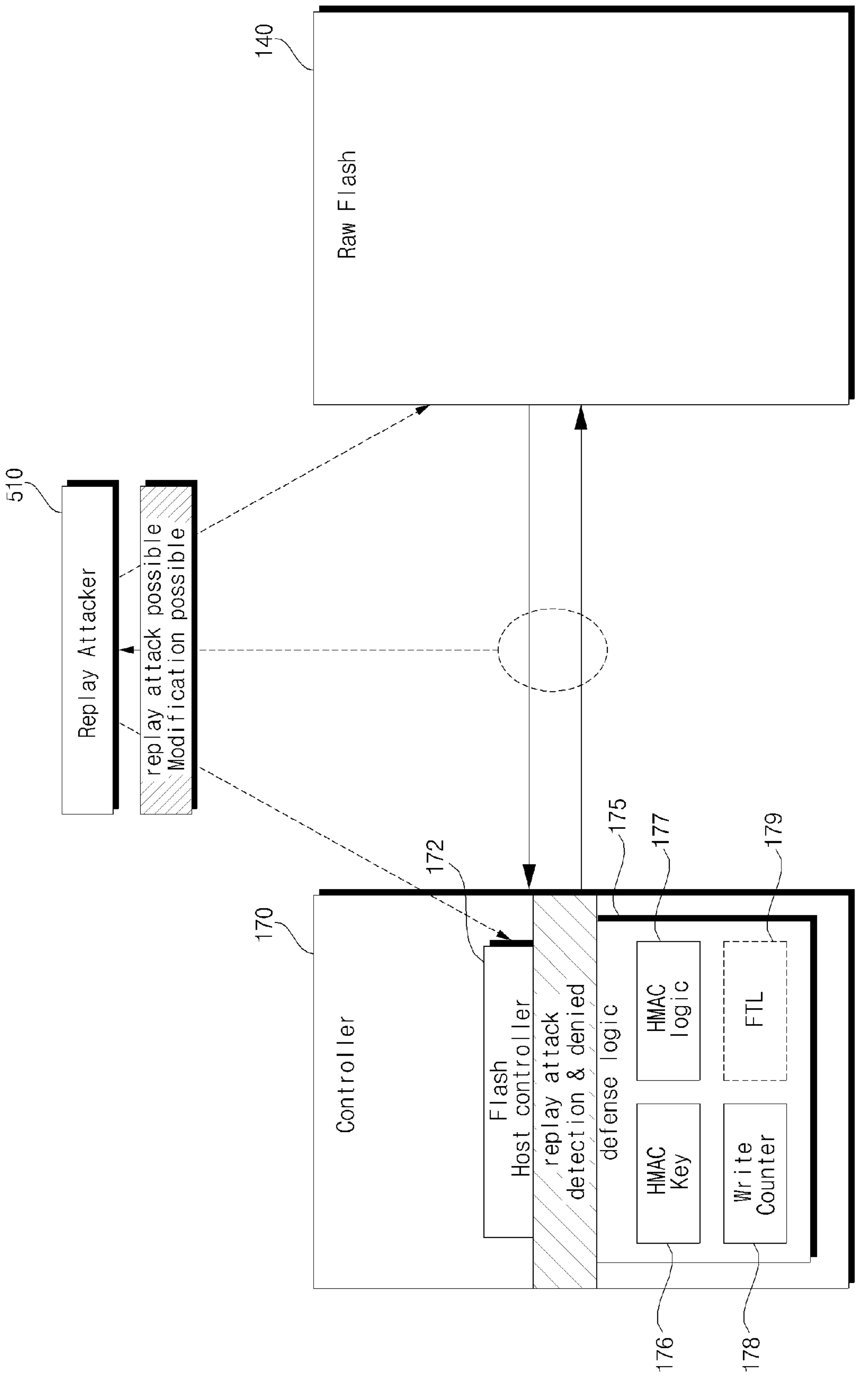
FIG. 8 is a diagram for explanation of a replay attack in an electronic apparatus according to an embodiment of the present invention.

FIG. 8 is a diagram for explanation of a replay attack in an electronic apparatus according to an embodiment of the present invention.

Referring to FIG. 8, an electronic apparatus 100 according to an embodiment of the present invention may include a non-volatile memory 140 not including a controller inside, and a controller 170 for controlling the non-volatile memory 140.

The controller 170 may include a memory controller 172 for controlling the non-volatile memory 140, and a defense unit 175 for defending against an external replay attack.

The defense unit 175 may include a hash-based message authentication code key 176 which is a hardware key, an HMAC logic 177, a write counter 178, and an Flash Translation Layer (FTL) 179.

Accordingly, in the case where a replay attacker 510 carries out a replay attack on the non-volatile memory 140, the non-volatile memory 140 may be protected by the defense unit 175 in the controller 170 of the electronic apparatus 100 even though the non-volatile memory 140 does not include an internal controller.

For example, when writing data into the non-volatile memory 140, the controller 170 of the electronic apparatus 100 transmits data, a write count, and an MAC together.

Using the HMAC key 176, which is a unique hardware key, and the HMAC logic 177 in the defense unit 175, the controller 170 of the electronic apparatus 170 generates the MAC.

In addition, a value of the write counter in the controller 170 of the electronic apparatus 100 keeps increasing every write time.

Accordingly, by checking a write count and an MAC in a data packet stored in the non-volatile memory 140, it is possible to determine whether there has been a replay attack.

For example, in the case where first data, a first count, and a first MAC are stored in the non-volatile memory 140 at a first point in time and then second data similar to the first data is stored at a second point in time in response to a replay attack, the second data, a second count, and a second MAC are additionally stored in the non-volatile memory 140.

Accordingly, the first data in the non-volatile memory 140 is not overwritten with the second data, and the second data is additionally stored in the non-volatile memory 140.

Meanwhile, the controller 170 of the electronic apparatus 100 compares a first data packet including the first data, the first count, and the first MAC, and a second data packet including the second data, the second count, and the second MAC, so as to determine whether there has been a replay attack.

FIGS. 9A to 9D are diagrams illustrating an internal structure of a non-volatile memory for explanation of a replay attack.

Figure 9A:
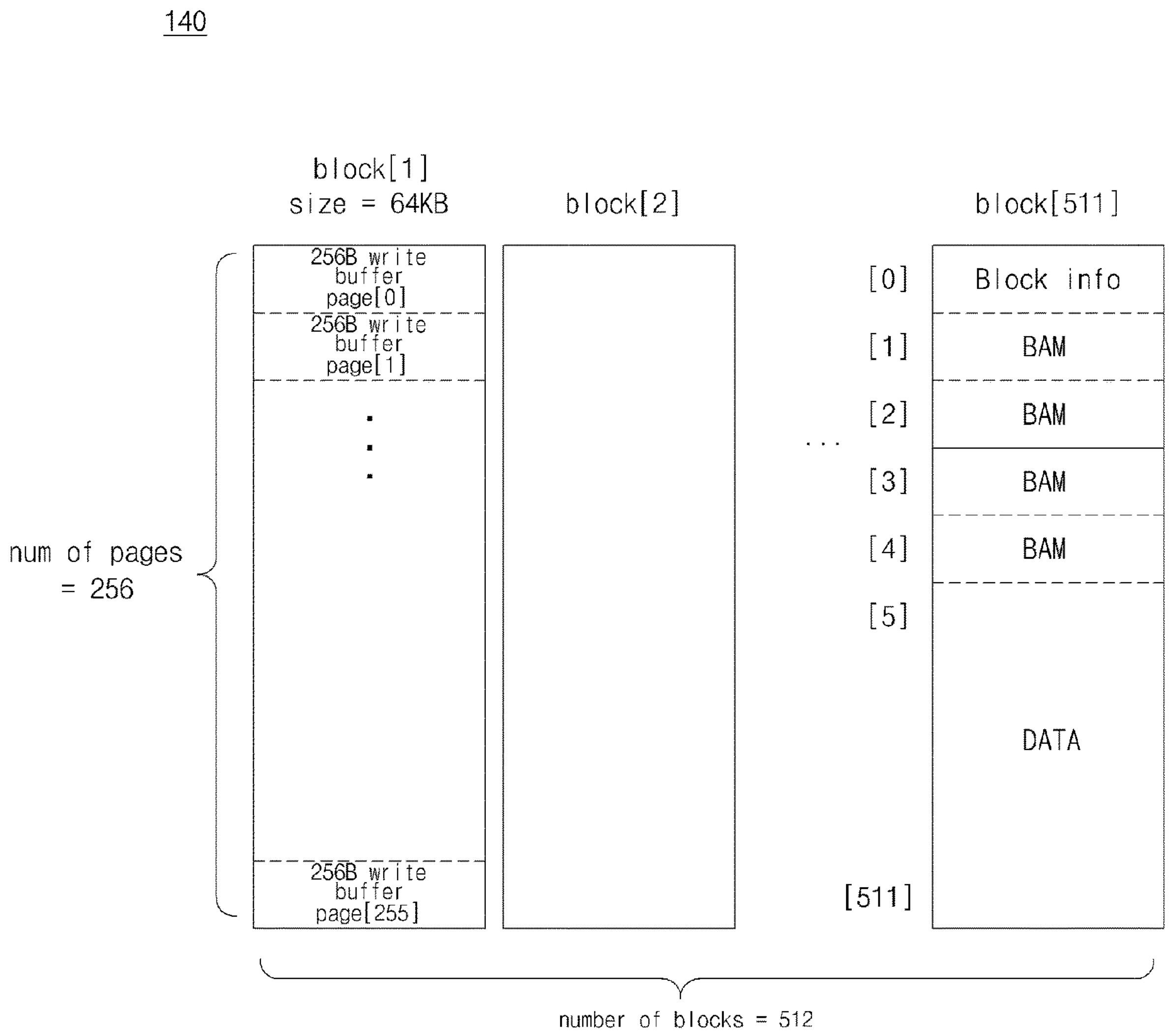
FIGS. 9A to 9D are diagrams illustrating an internal structure of a non-volatile memory for explanation of a replay attack.

First, FIG. 9A is a diagram illustrating blocks of the non-volatile memory 140.

With reference to the drawing, the non-volatile memory 140 may be provided with a plurality of blocks to store data.

In addition, each block may include block information, a block allocation map, and data.

Meanwhile, each block may be provided with a plurality of buffers, and block information, a block allocation map, and data may be deployed to each buffer.

Figure 9B:
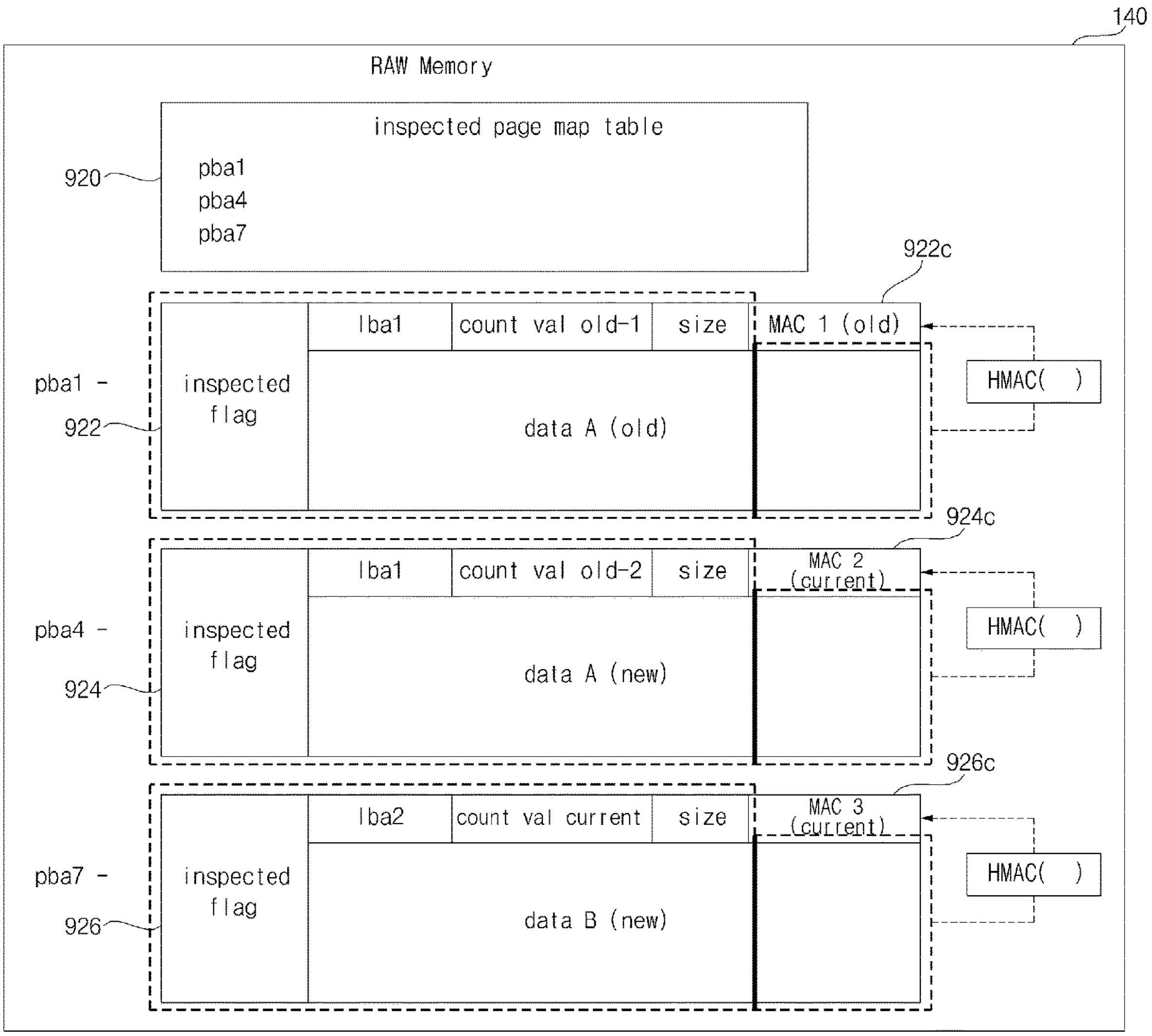

Next, FIG. 9B illustrates the case where the non-volatile memory 140 includes an inspected page map table 920 and data packets 922, 924, and 926.

The inspected page map table 920 may include flags pba1, pba4, and pba7 for the respective data packets 922, 924, and 926.

Meanwhile, each of the data packets 922, 924, and 926 may include an inspected flag which is a mapping flag, data, and an MAC.

Meanwhile, the controller 170 of the electronic apparatus 100 may transmit different counts together with the same first data at a first point and at a second point in time.

Meanwhile, the controller 170 of the electronic apparatus 100 may transmit different counts together with the same first data at a first point in time and at a second point in time.

The drawing illustrates an example in which data in a first data packet 922 and data in a second data packet 924 are identically data A, while having different MACs of MAC1 and MAC2. Accordingly, it is possible to defend against a replay attack.

Figure 9C:
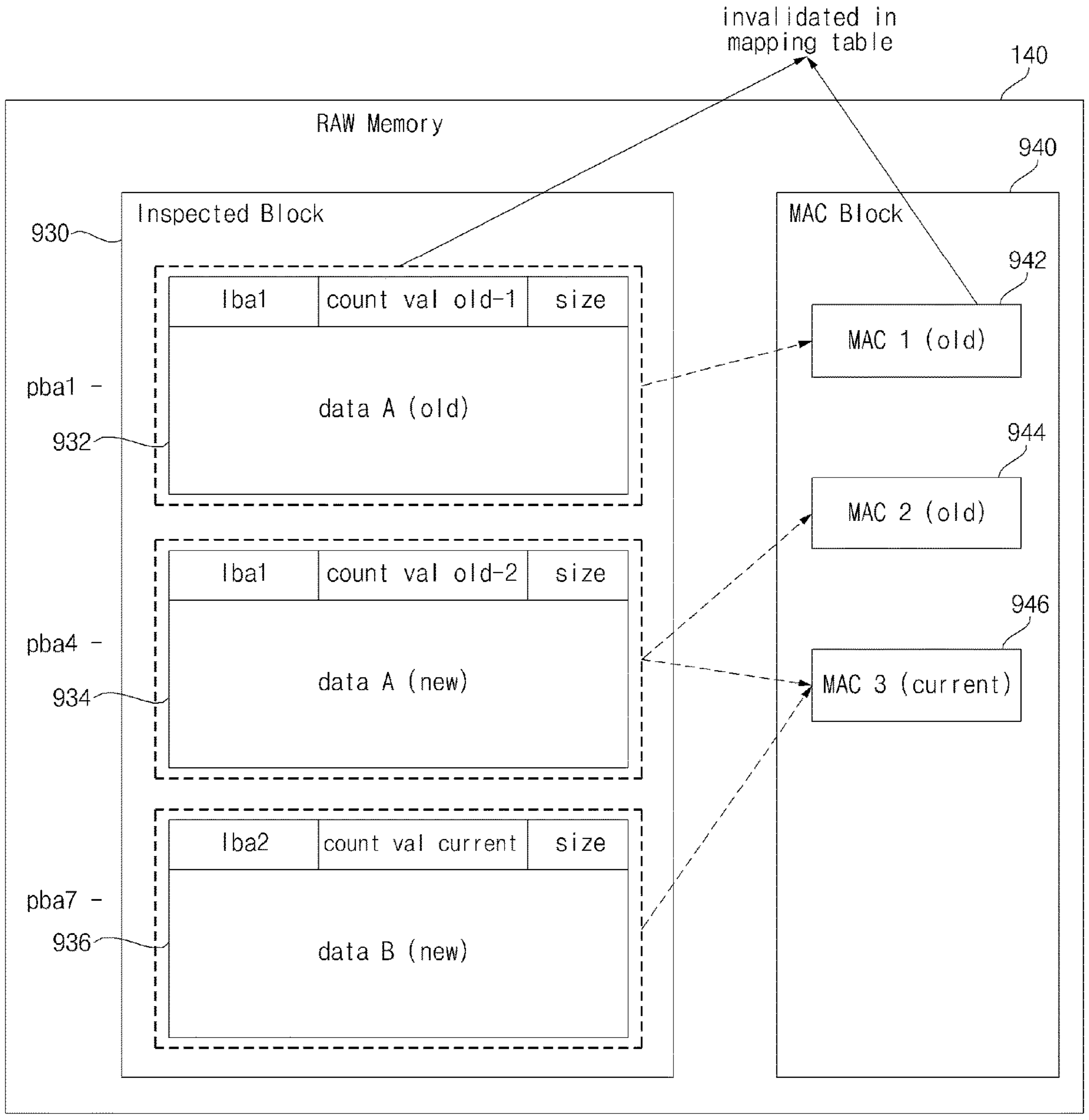

Next, FIG. 9C illustrates an example in which the non-volatile memory 140 includes an inspected block and an MAC block 940.

Referring to FIG. 9C, the inspected block may be provided with a plurality of data 932, 934, and 936, and the MAC block 940 may be provided with a plurality of MACs 942, 944, and 946 respectively corresponding to the plurality of data 932, 934, and 936.

Meanwhile, the controller 170 of the electronic apparatus 100 may transmit different counts together with the same first data at a first point and at a second point in time.

Meanwhile, the controller 170 of the electronic apparatus 100 may transmit different counts together with the first data at the first point in time and at the second point in time.

The drawing illustrates an example in which first data 932 and the second data 934 are identical but respectively have different MACs of MAC1 942 and MAC2 944. Accordingly, it is possible to defend against a replay attack.

Figure 9D:
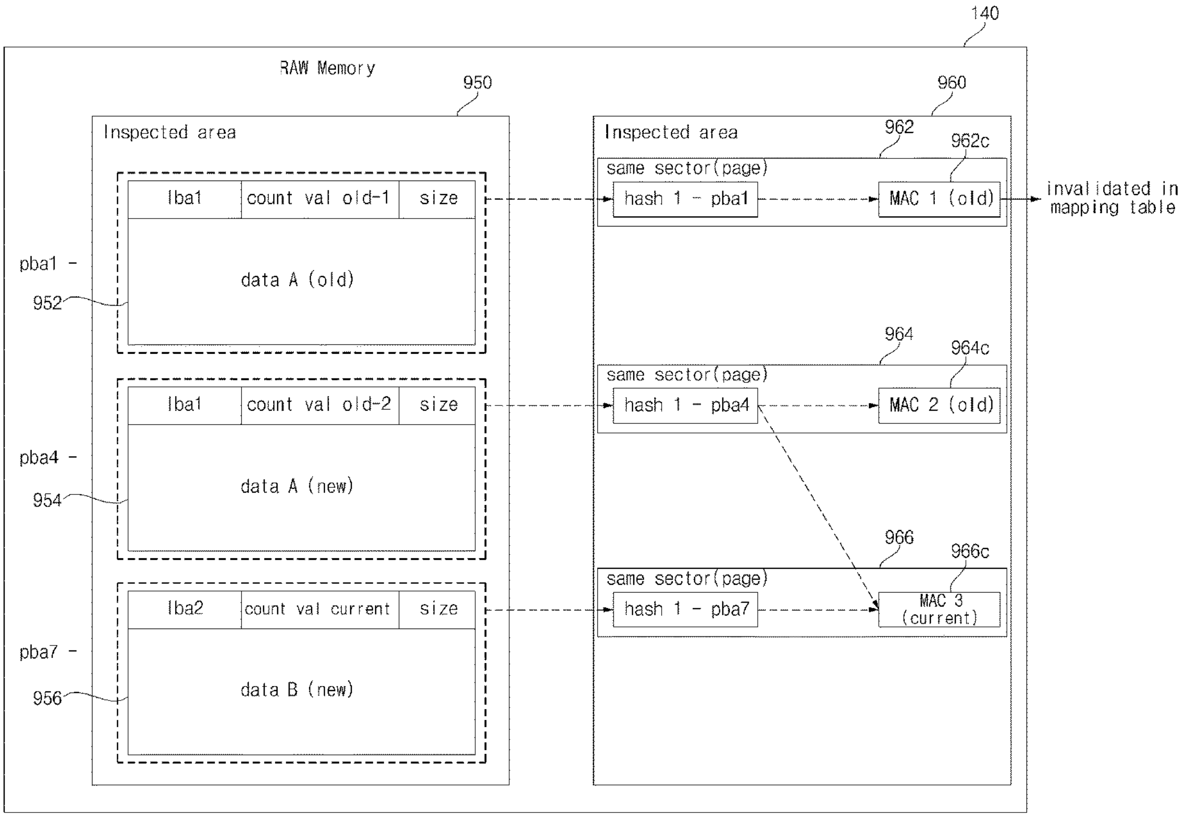

Next, FIG. 9D illustrates an example in which the non-volatile memory 140 includes an inspected area 950 and a Mac block 960.

Referring to FIG. 9D, the inspective area 950 may be provided with a plurality of data 952, 954, and 956, and the MAC block 960 may include a plurality of sectors 962, 964, and 966 respectively corresponding to the plurality of data 952, 954, and 956.

Meanwhile, the plurality of sectors 962, 964, and 966 may include a plurality of MACs 962*c*, 964*c*, and 966*c* respectively corresponding to the plurality of data 952, 954, and 956.

Meanwhile, the controller 170 of the electronic apparatus 100 may transmit different counts together with the same first data at a first point and at a second point in time.

Meanwhile, the controller 170 of the electronic apparatus 100 may transmit different counts together with the first data at the first point in time and at the second point in time.

The drawing illustrates an example in which first data 952 and second data 954 are identically data A but respectively have different MACs of MAC1 962*c* and MAC2 964*c*, respectively. Accordingly, it is possible to defend against a replay attack.

Meanwhile, a method of operating the electronic apparatus of the present invention may be implemented in a recording medium in the form of a code readable by a processor provided in the electronic apparatus. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). Furthermore, the recording medium readable by a processor may be distributed over computer systems connected over a network, and the code readable by a processor may be stored and executed in a distributed manner.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

One object of the present invention is to provide an electronic device capable of efficiently defending a replay attack in a non-volatile memory having no internal controller.

In accordance with an embodiment of the present invention, the above and other objects can be accomplished by the provision of an electronic apparatus including: a non-volatile memory having no internal controller; and a controller configured to: control the non-volatile memory, and transmit, to the non-volatile memory, first data and a generated first message authentication code (MAC).

The controller may be further configured to transmit the first MAC together with the first data at a first point in time and a second MAC together with the same first data at a second point in time.

The controller may be further configured to transmit the first data, the first MAC, and a first count all together when transmitting the first data to the non-volatile memory.

The controller may be further configured to transmit the first count together with the first data at a first point and a second count together with the same first data at a second point in time.

The controller may be further configured to transmit the first MAC together with the first data at the first point in time and a second MAC together with the same first data at the second point in time.

The controller may include a defense unit for defending against an external replay attack, and at least a part of the defense unit includes hardware, and wherein the defense unit includes a message authentication code (MAC) key, a MAC logic, and a write counter.

The controller may be further configured to generate the first MAC by using the first data, the MAC key, and the MAC logic.

The controller may be further configured in order to receive, from the non-volatile memory, data for authentication, to receive, together, data to be read, a write count, and a MAC The controller may be further configured to: determine a write count value required for data to be read from the volatile memory; and compare a write counter, included together with data and a MAC in a data packet received from the non-volatile memory, with the determined write count value, and when the write counter does not match with the write counter value, stop a data read operation.

The controller may be further configured to: determine a write count value required for data to be read from the non-volatile memory; determine another MAC using the determined write count value and a MAC key; compare a MAC, included together with data and a write count in a data packet received from the non-volatile memory, with the other MAC, and when the MAC does not match with the other MAC, stop a data read operation.

The controller may be further configured to check a replay attack on an inspection area at the non-volatile memory by checking a write count and checking a MAC in a data packet from the non-volatile memory.

The controller may be further configured to: determine a write count value required for data to be read from the non-volatile memory; determine another MAC using the determined write count value and a MAC key; and when the determined other MAC does not match with a MAC in a data packet stored in then the non-volatile memory, determine occurrence of a replay attack.

The check of the replay attack on the inspection area at the non-volatile memory is performed by at least one of a write operation to the non-volatile memory, a read operation from the non-volatile memory, and a data garbage collection.

The non-volatile memory may include a plurality of data packets and a map table having flags respectively corresponding to the plurality of data packets, and each of the plurality of data packets may include data and a MAC.

The non-volatile memory may include a plurality of data packets and a map table having flags respectively corresponding to the plurality of data packets, and each of the plurality of data packets may include data and a MAC.

The non-volatile memory may include: an inspection block having a plurality of data; and a MAC block having MACs respectively corresponding to the plurality of data.

According to another embodiment of the present invention, an electronic apparatus includes: a non-volatile memory having no internal controller; and a controller configured to: transmit, to the non-volatile memory, first data and a first message authentication code (MAC), wherein the controller, at least a part of which includes hardware, includes a defense unit for defending against an external replay attack, and wherein the defense unit includes a MAC key, a MAC logic, and a write counter.

The controller may be configured to transmit the first MAC together with the first data at a first point in time, and transmit a second MAC together with the same first data at a second point in time.

The controller may be configured to transmit the first data, the first MAC, and a first count all together.

The controller may be configured to generate the first MAC using the data, the MAC key, and the MAC logic.

The controller may be configured to determine a write count value required for data to be read from the volatile memory; and compare a write counter, included together with data and a MAC in a data packet received from the non-volatile memory, with the determined write count value, and when the write counter does not match with the write counter value, stop a data read operation.

According to an embodiment of the present invention, an electronic apparatus includes: a non-volatile memory having no internal controller; and a controller configured to: control the non-volatile memory, and transmit, to the non-volatile memory, first data and a generated first message authentication code (MAC). Accordingly, it is possible to efficiently defend against a replay attack.

The controller may be further configured to transmit different MACs together with the same first data at a first point and at a second point in time. Accordingly, it is possible to efficiently defend against a replay attack.

The controller may be further configured to transmit the first data, the first MAC, and a first count all together when transmitting the first data to the non-volatile memory. Accordingly, it is possible to efficiently defend against a replay attack.

The controller may be further configured to transmit the first count together with the first data at a first point and a second count together with the same first data at a second point in time. Accordingly, it is possible to efficiently defend against a replay attack.

The controller may be further configured to transmit the first MAC together with the first data at the first point in time and a second MAC together with the same first data at the second point in time. Accordingly, it is possible to efficiently defend against a replay attack.

The controller may include a defense unit for defending against an external replay attack, and at least a part of the defense unit includes hardware, and wherein the defense unit includes a message authentication code (MAC) key, a MAC logic, and a write counter. Accordingly, it is possible to efficiently defend against a replay attack.

The controller may be further configured to generate the first MAC by using the first data, the MAC key, and the MAC logic. Accordingly, it is possible to efficiently defend against a replay attack.

The controller may be further configured in order to receive, from the non-volatile memory, data for authentication, to receive, together, data to be read, a write count, and a MAC. Accordingly, it is possible to efficiently defend against a replay attack.

The controller may be further configured to: determine a write count value required for data to be read from the volatile memory; and compare a write counter, included together with data and a MAC in a data packet received from the non-volatile memory, with the determined write count value, and when the write counter does not match with the write counter value, stop a data read operation. Accordingly, it is possible to efficiently defend against a replay attack.

The controller may be further configured to: determine a write count value required for data to be read from the non-volatile memory; determine another MAC using the determined write count value and a MAC key; compare a MAC, included together with data and a write count in a data packet received from the non-volatile memory, with the other MAC, and when the MAC does not match with the other MAC, stop a data read operation. Accordingly, it is possible to efficiently defend against a replay attack.

The controller may be further configured to check a replay attack on an inspection area at the non-volatile memory by checking a write count and checking a MAC in a data packet from the non-volatile memory. Accordingly, it is possible to efficiently defend against a replay attack.

The controller may be further configured to: determine a write count value required for data to be read from the non-volatile memory; determine another MAC using the determined write count value and a MAC key; and when the determined other MAC does not match with a MAC in a data packet stored in then the non-volatile memory, determine occurrence of a replay attack. Accordingly, it is possible to efficiently defend against a replay attack.

The check of the replay attack on the inspection area at the non-volatile memory is performed by at least one of a write operation to the non-volatile memory, a read operation from the non-volatile memory, and a data garbage collection. Accordingly, it is possible to efficiently defend against a replay attack.

The non-volatile memory may include a plurality of data packets and a map table having flags respectively corresponding to the plurality of data packets, and each of the plurality of data packets may include data and a MAC. Accordingly, it is possible to efficiently defend against a replay attack.

The non-volatile memory may include: an inspection block having a plurality of data; and a MAC block having MACs respectively corresponding to the plurality of data. Accordingly, it is possible to efficiently defend against a replay attack.

According to another embodiment of the present invention, an electronic apparatus includes: a non-volatile memory having no internal controller; and a controller configured to: transmit, to the non-volatile memory, first data and a first message authentication code (MAC), wherein the controller, at least a part of which includes hardware, includes a defense unit for defending against an external replay attack, and wherein the defense unit includes a MAC key, a MAC logic, and a write counter. Accordingly, it is possible to efficiently defend against a replay attack.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic apparatus comprising:

a non-volatile memory having no internal controller; and a controller for transmitting, to the non-volatile memory, first data and a generated first message authentication code (MAC), wherein the controller transmits the first data, the first MAC, and a first count all together when transmitting the first data to the non-volatile memory.

2. The electronic apparatus of claim 1, wherein the controller transmits the first MAC together with the first data at a first point in time and a second MAC together with the same first data at a second point in time.

3. The electronic apparatus of claim 1, wherein the controller transmits the first count together with the first data at a first point and a second count together with the same first data at a second point in time.

4. The electronic apparatus of claim 3, wherein the controller transmits the first MAC together with the first data at the first point in time and a second MAC together with the same first data at the second point in time.

5. The electronic apparatus of claim 1, wherein the controller includes a defense unit for defending against an external replay attack, and at least a part of the defense unit includes hardware, and wherein the defense unit includes a message authentication code (MAC) key, a MAC logic, and a write counter.

6. The electronic apparatus of claim 5, wherein the controller generates the first MAC by using the first data, the MAC key, and the MAC logic.

7. The electronic apparatus of claim 5, wherein in order to receive, from the non-volatile memory, data for authentication, to receive, together, data to be read, a write count, and a MAC.

8. The electronic apparatus of claim 5, wherein the controller determines a write count value required for data to be read from the non-volatile memory;

determines another MAC using the determined write count value and a MAC key;

compares a MAC, included together with data and a write count in a data packet received from the non-volatile memory, with the other MAC, and when the MAC does not match with the other MAC, stop a data read operation.

9. The electronic apparatus of claim 1, wherein a data packet received from the non-volatile memory includes data, a write counter, and MAC, wherein the controller is configured to:

determine a write count value required for data to be read from the non-volatile memory; and compare a value of the write counter of the data packet received from the non-volatile memory, with the determined write count value, and when the value of the write counter does not match with the write counter value, stop a data read operation.

10. The electronic apparatus of claim 1, wherein the controller checks a replay attack on an inspection area at the non-volatile memory by checking a write count and checking a MAC in a data packet from the non-volatile memory.

11. The electronic apparatus of claim 10, wherein the controller determines a write count value required for data to be read from the non-volatile memory;

determines another MAC using the determined write count value and a MAC key; and when the determined other MAC does not match with a MAC in a data packet stored in the non-volatile memory, determine occurrence of a replay attack.

12. The electronic apparatus of claim 10, wherein the check of the replay attack on the inspection area at the non-volatile memory is performed by at least one of a write operation to the non-volatile memory, a read operation from the non-volatile memory, and a data garbage collection.

13. The electronic apparatus of claim 1, wherein the non-volatile memory includes a plurality of data packets and a map table having flags respectively corresponding to the plurality of data packets, and wherein each of the plurality of data packets includes data and a MAC.

14. The electronic apparatus of claim 1, wherein the non-volatile memory comprises:

an inspection block having a plurality of data; and a MAC block having MACs respectively corresponding to the plurality of data.

15. An electronic apparatus comprising:

a non-volatile memory having no internal controller; and a controller for transmitting, to the non-volatile memory, first data and a first message authentication code (MAC), wherein the controller, at least a part of which includes hardware, includes a defense unit for defending against an external replay attack, and wherein the defense unit includes a MAC key, a MAC logic, and a write counter, wherein the controller transmits the first data, the first MAC, and a first count all together.

16. The electronic apparatus of claim 15, wherein the controller transmits the first MAC together with the first data at a first point in time, and transmit a second MAC together with the same first data at a second point in time.

17. The electronic apparatus of claim 15, wherein the controller generates the first MAC using the data, the MAC key, and the MAC logic.

18. The electronic apparatus of claim 15, wherein a data packet received from the non-volatile memory includes data, a write counter, and MAC, wherein the controller determines a write count value required for data to be read from the non-volatile memory; and compares a value of the write counter of the data packet received from the non-volatile memory, with the determined write count value, and when the value of the write counter does not match with the write counter value, stop a data read operation.

* * * * *